US010215579B2

(12) United States Patent
Jung et al.

(10) Patent No.: US 10,215,579 B2
(45) Date of Patent: Feb. 26, 2019

(54) METHOD AND APPARATUS FOR ESTIMATING DRIVING INFORMATION

(71) Applicants: SAMSUNG ELECTRONICS CO., LTD., Suwon-si (KR); North Carolina State University, Raleigh, NC (US)

(72) Inventors: Daebong Jung, Seongnam-si (KR); Mo-Yeun Chow, Raleigh, NC (US); Zheyuan Cheng, Raleigh, NC (US); Jinyong Jeon, Yongin-si (KR)

(73) Assignees: Samsung Electronics Co., Ltd., Suwon-si (KR); North Carolina State University, Raleigh, NC (US)

( * ) Notice: Subject to any disclaimer, the term of this patent is extended or adjusted under 35 U.S.C. 154(b) by 0 days.

(21) Appl. No.: 15/699,079

(22) Filed: Sep. 8, 2017

(65) Prior Publication Data

US 2018/0164111 A1   Jun. 14, 2018

Related U.S. Application Data

(60) Provisional application No. 62/433,868, filed on Dec. 14, 2016.

(30) Foreign Application Priority Data

Dec. 21, 2016   (KR) .................. 10-2016-0175812

(51) Int. Cl.
*G01C 21/34*   (2006.01)
*G08G 1/01*   (2006.01)
*G01C 21/36*   (2006.01)

(52) U.S. Cl.
CPC ......... *G01C 21/3492* (2013.01); *G01C 21/34* (2013.01); *G01C 21/3469* (2013.01);
(Continued)

(58) Field of Classification Search
USPC ....................................................... 701/423
See application file for complete search history.

(56) References Cited

U.S. PATENT DOCUMENTS

| 9,002,612 B2* | 4/2015 | McNew | ............... | G06N 99/005 |
|---|---|---|---|---|
| | | | | 701/33.4 |
| 2013/0066547 A1* | 3/2013 | Schramm | ........... | G01C 21/3453 |
| | | | | 701/408 |

(Continued)

FOREIGN PATENT DOCUMENTS

| JP | 3099934 B2 | 10/2000 |
|---|---|---|
| JP | 4808941 B2 | 11/2011 |

(Continued)

OTHER PUBLICATIONS

Yang, Jyun-Yan, et al. "Average-speed forecast and adjustment via VANETs." IEEE transactions on vehicular technology 62.9 (2013): 4318-4327.

(Continued)

*Primary Examiner* — Tyler D Paige
(74) *Attorney, Agent, or Firm* — NSIP Law

(57) ABSTRACT

Disclosed are a method and an apparatus for estimating driving information, the apparatus receives a driving route of a vehicle, generates speed deviations corresponding to points on the driving route, and generates a speed profile that is a sequence of predicted speeds corresponding to the points based on the speed deviations and average speeds corresponding to the points.

20 Claims, 12 Drawing Sheets

(52) U.S. Cl.
CPC ........... *G01C 21/3691* (2013.01); *G08G 1/01* (2013.01); *G08G 1/0104* (2013.01); *B60L 2240/68* (2013.01); *B60L 2260/52* (2013.01); *B60W 2550/143* (2013.01); *B60W 2720/103* (2013.01)

(56) References Cited

U.S. PATENT DOCUMENTS

| | | | |
|---|---|---|---|
| 2013/0073113 A1 | 3/2013 | Wang et al. | |
| 2014/0067265 A1* | 3/2014 | Maston | G01C 21/3697 701/533 |
| 2015/0034436 A1 | 2/2015 | McAndrews et al. | |
| 2015/0197248 A1 | 7/2015 | Breed et al. | |
| 2015/0224990 A1* | 8/2015 | Kim | B60W 50/0097 701/98 |
| 2015/0319093 A1* | 11/2015 | Stolfus | H04L 12/6418 370/237 |
| 2018/0164111 A1* | 6/2018 | Jung | G01C 21/3492 |

FOREIGN PATENT DOCUMENTS

| | | |
|---|---|---|
| KR | 10-0345792 B1 | 7/2002 |
| KR | 10-2004-0086676 A | 10/2004 |
| KR | 10-0900809 B1 | 4/2009 |
| KR | 10-1601034 B1 | 3/2016 |
| KR | 10-1612867 B1 | 4/2016 |
| WO | WO 2015/153140 A1 | 10/2015 |

OTHER PUBLICATIONS

Park, Jungme, et al. "Intelligent speed profile prediction on urban traffic networks with machine learning." Neural Networks (IJCNN), The 2013 International Joint Conference on. IEEE, 2013.

Lemieux, Joe, et al. "Vehicle speed prediction using deep learning." Vehicle Power and Propulsion Conference (VPPC), 2015 IEEE. IEEE, 2015.

Jiang, Bingnan, et al. "Traffic and vehicle speed prediction with neural network and hidden markov model in vehicular networks." Intelligent Vehicles Symposium (IV), 2015 IEEE. IEEE, (2015): 1082-1087.

Liu, Ruoqian, et al. "Real time vehicle speed predition using gas-kinetic traffic modeling." Computational Intelligence in Vehicles and Transportation Systems (CIVTS), 2011 IEEE Symposium on. IEEE, 2011.

* cited by examiner

METHOD AND APPARATUS FOR ESTIMATING DRIVING INFORMATION

CROSS-REFERENCE TO RELATED APPLICATIONS

This application claims the priority benefit of U.S. Provisional Application No. 62/433,868 filed on Dec. 14, 2016, in the U.S. Patent and Trademark Office, and Korean Patent Application No. 10-2016-0175812 filed on Dec. 21, 2016, in the Korean Intellectual Property Office, the entire disclosures of which are incorporated herein by reference for all purposes.

BACKGROUND

1. Field

The following description relates to driving information estimation and vehicle control.

2. Description of Related Art

An accurate estimation on driving information of a vehicle is needed to efficiently control the vehicle. As environmental concerns and the paucity of renewable energy resources becoming prominent issues, various control methods have been provided to increase the energy efficiencies of vehicles. Driving information estimated based on a typical driving pattern may not consider traffic conditions and variables in an ambient environment around the vehicle, and thus, the accuracy of the estimated driving information may decrease. Accordingly, technology for estimating driving information of a vehicle based on a variety of real-time information can increase the accuracy of the driving information, and efficiently control the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided method of estimating driving information, the method including receiving a driving route of a vehicle, generating speed deviations corresponding to points on the driving route, and generating a speed profile including a sequence of predicted speeds corresponding to the points based on the speed deviations and average speeds corresponding to the points.

The generating of the speed deviations may include acquiring a driving characteristic of the driving route, and generating the speed deviations based on the driving characteristic and relative locations of the points using an adaptive neuro-fuzzy inference system (ANFIS).

The method of claim 2, wherein the ANFIS may include a membership function of the driving characteristic, and the driving characteristic may include any one or any combination of a driver type, a traffic flow, a weather condition, a road type, and a road curvature.

The method of claim 3, wherein the ANFIS may include ANFISs corresponding to membership functions of the driver type, and the generating of the speed deviations may include generating sub-road-types corresponding to the road type of the relative locations, selecting an ANFIS corresponding to a membership function among the membership functions of the driver type based on a sub-road-type corresponding to a relative location among the relative locations, and generating a speed deviation corresponding to the relative location based on the sub-road-type and the relative location using the selected ANFIS.

The driver type may be defined based on a speed deviation corresponding to the road type.

A membership function of the driver type may include at least one of a membership function corresponding to a conservative type, a membership function corresponding to a normal type, or a membership function corresponding to an aggressive type, a membership function of the traffic flow may include at least one of a membership function corresponding to a light flow, a membership function corresponding to a medium flow, or a membership function corresponding to a heavy flow, a membership function of the weather condition may include at least one of a membership function corresponding to a clear weather condition or a membership function corresponding to a wet weather condition, a membership function of the road type may include at least one of a membership function corresponding to a local road, a membership function corresponding to a local highway, or a membership function corresponding to a highway, and a membership function of the road curvature may include at least one of a membership function corresponding to a small curvature, a membership function corresponding to a medium curvature, or a membership function corresponding to a large curvature.

The generating of the speed deviations may include acquiring a driving characteristic of the driving route, generating sub-driving-characteristics corresponding to relative locations of the points based on the driving characteristic, and generating a speed deviation corresponding to a relative location among the relative locations based on the relative location and a sub-driving-characteristic corresponding to the relative location.

The generating of the speed deviations may include acquiring a driving characteristic of the driving route, generating sub-driving-characteristics corresponding to relative locations of the points based on the driving characteristic, and generating an output vector representing the speed deviations based on a first input vector representing the relative locations and a second input vector representing the sub-driving-characteristics.

The generating of the speed deviations may include determining a number of the points by comparing a length of the driving route to a threshold length, and setting the points on the driving route based on the determined number of the points.

The generating of the speed deviations may include dividing the driving routes into sub-driving-routes by comparing a length of the driving route to a threshold length, and generating speed deviations corresponding to points on a sub-driving-route among the sub-driving-routes.

The method may include predicting an amount of power to be used by the vehicle based on the speed profile.

The may include predicting an amount of power to be transferred to a powertrain of the vehicle based on the speed profile, and predicting an amount of power to be used by an air conditioning system of the vehicle based any one or any combination of solar radiation information and ambient temperature information.

The method may include determining a driving range of the vehicle based on a predicted value of an amount of power to be used by the vehicle and at least one of a current amount of fuel of the vehicle or current state information of a battery unit of the vehicle.

The determining of the driving range of the vehicle may include predicting at least one of an amount of fuel or state information of the battery unit at a destination based on the predicted value, and determining whether the vehicle is able to reach the destination based on at least one of the predicted amount of fuel or the predicted state information.

The method may include generating guide information to drive the vehicle based on the speed profile, and outputting the guide information visually.

The generating of the guide information may include comparing a predicted speed obtained based on the speed profile and a target speed obtained based on driving history information of the vehicle, and generating the guide information based on the comparison.

The generating of the guide information may include identifying a speed interval satisfying a criterion from the speed profile, and generating guide information used for driving on a route corresponding to the identified speed interval.

In another general aspect, there is provided an apparatus for estimating driving information, the apparatus including a processor configured to receive a driving route of a vehicle, to generate speed deviations corresponding to points on the driving route, and to generate a speed profile including a sequence of predicted speeds corresponding to the points based on the speed deviations and average speeds corresponding to the points.

The processor may be configured to acquire a driving characteristic of the driving route and to generate the speed deviations based on the driving characteristic and relative locations of the points using an adaptive neuro-fuzzy inference system (ANFIS), the ANFIS may include a membership function of the driving characteristic, and the driving characteristic may include any one or any combination of a driver type, a traffic flow, a road type, and a road curvature.

Other features and aspects will be apparent from the following detailed description, the drawings, and the claims.

Figure 1:
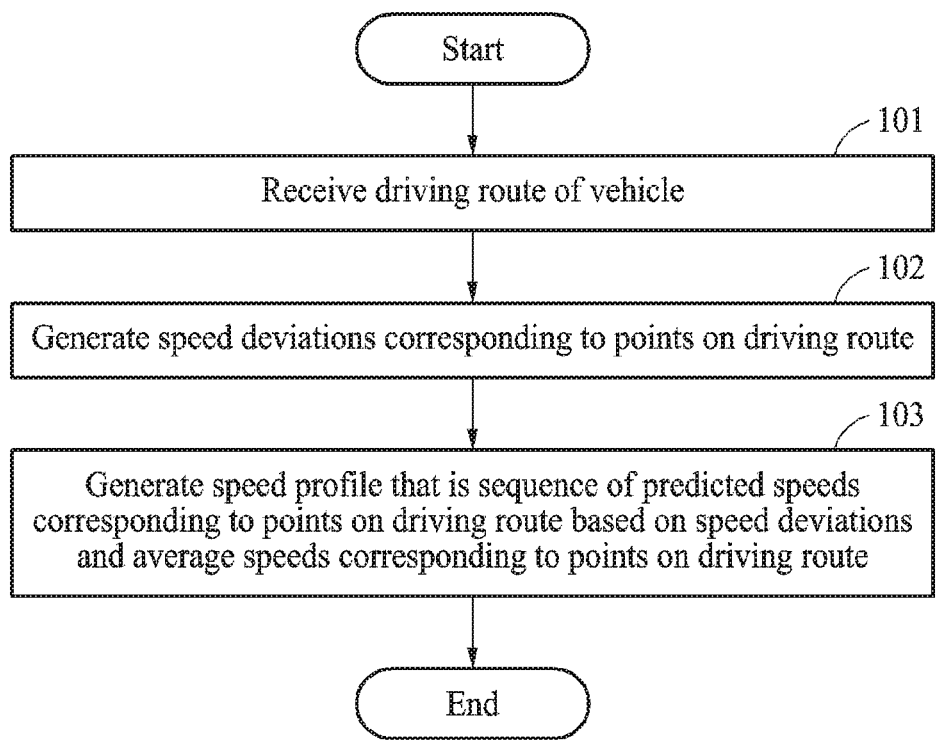
FIG. 1 illustrates an example of a driving information estimation method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Hereinafter, reference will now be made in detail to examples with reference to the accompanying drawings, wherein like reference numerals refer to like elements throughout.

FIG. 1 illustrates an example of a driving information estimation method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in 101, a driving information estimation apparatus receives a driving route of a vehicle. The driving route is a route along which a vehicle travels and, for example, a route along which a vehicle travels from a point of departure to a destination. The driving route may be information that is input from a user or a driver of the vehicle or received from an external server or database. The driving route is set based on a point of departure and a destination input through, for example, a vehicular navigation service and includes a route along which the vehicle is to travel. A driving information estimation apparatus is an apparatus for estimating driving information and implemented by software modules, hardware modules, or a combination thereof. The driving information estimation apparatus is implemented as, for example, a vehicle control unit (VCU). The VCU is configured to generate a command or a processing signal for controlling a vehicle and control an operation or a state of the vehicle.

In an example, the driving information estimation apparatus is implemented as a server included in the vehicle or configured to control the vehicle, an external module, or an external device communicating with various devices in the vehicle, such as, for example, a mobile phone an intelligent agent, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a home appliance, content players, communication systems, other consumer electronics/information technology (CE/IT) device, or any other device capable of wireless communication or network communication consistent with that disclosed herein or various other Internet of Things (IoT) devices that are controlled through a network. The driving information estimation apparatus may be implemented in a smart appliance, an intelligent automobile, and an autonomous driving vehicle.

The driving information estimation apparatus may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses. Other implementation scheme of the driving information estimation apparatus may also vary based on a design.

In 102, the driving information estimation apparatus generates speed deviations corresponding to points on the driving route. The driving information estimation apparatus sets points on the received driving route, and an example of setting the points on the driving route will also be described with reference to FIG. 2. A speed deviation is information used to predict a speed of a vehicle at a particular point, and defined as a difference between an average speed and a predicted speed. In an example, the average speed is a speed used as a criterion for predicting a speed of the vehicle. The average speed includes, for example, a statistical average speed of vehicles travelling at a point, a speed limit at the point, and an average speed of vehicles based on a traffic flow. In an example, the driving information estimation apparatus receives the average speed from an external server or acquires the average speed from a memory. When a speed limit is employed as the average speed, the driving information estimation apparatus applies a road type defined based on the speed limit for estimating a speed deviation. An example of the speed limit employed as the average speed will also be described with reference to FIG. 2. The speed deviation is expressed as Equation 1.

$$\delta S(x,y)=S(x,y)-S_n(x,y) \qquad \text{[Equation 1]}$$

In Equation 1, (x,y) denotes a point on a driving route, $\delta S(x,y)$ denotes a speed deviation corresponding to (x,y), $S(x,y)$ denotes a predicted speed corresponding to (x,y), and $S_n(x,y)$ denotes an average speed corresponding to (x,y). In an example, using Equation 1, the driving information estimation apparatus generates speed deviations) $\delta S(x,y)$ corresponding to points on the driving route.

In 103, the driving information estimation apparatus generates a speed profile that is a sequence of predicted speeds at the points on the driving route. The predicted speeds are based on the speed deviations and average speeds at the points on the driving route. According to Equation 1, the driving information estimation apparatus obtains a sum of the average speeds $S_n(x,y)$ and the speed deviations $\delta S(x,y)$ corresponding to the points on the driving route and obtains predicted speeds $S(x,y)$ thereby generating a speed profile defined as a sequence of the predicted speeds $S(x,y)$. The driving information estimation apparatus generates the speed profile based on the driving route, and generates driving related information, state information, or a control command to be used for controlling the vehicle based on the generated speed profile. An example of application of the speed profile will also be described with reference to FIGS. 7 and 8.

Figure 2:
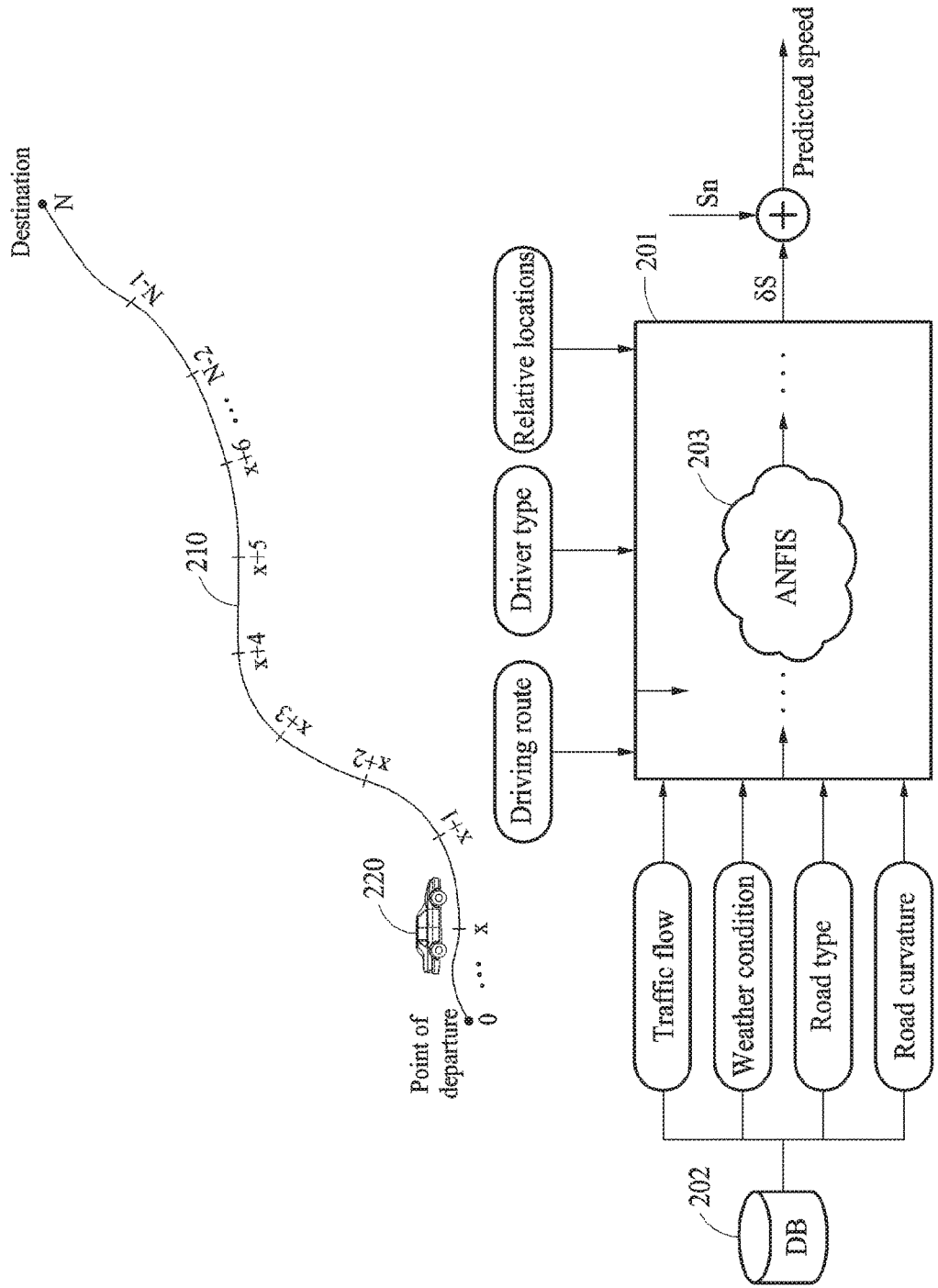
FIG. 2 illustrates an example of an operation of estimating driving information.

FIG. 2 illustrates an example of an operation of estimating driving information.

Referring to FIG. 2, a driving information estimation apparatus 201 acquires a driving characteristic of a driving route 210 of a vehicle 220. The driving characteristic is a parameter used to generate a speed profile of the driving route 210, and indicates a characteristic related to the driving route 210. The driving characteristic includes, for example, a driver type, a traffic flow, a weather condition, a road type, and a road curvature. The driving information estimation apparatus 201 acquires the driving characteristic of the driving route 201 from a database 202 configured in advance. The database 202 is implemented as, for example, an external device such as a server to be connected to the driving information estimation apparatus 201 wired, wirelessly, or through a network. The database 202 may also be implemented as a memory (not shown) included in the driving information estimation apparatus 201. When the driving route 210 is received, the driving information estimation apparatus 201 transmits the driving route 210 to the external server and requests the external server to provide the driving characteristic of the driving route 210. For example, the driving information estimation apparatus 201 collects information on the traffic flow of the driving route 210 from a traffic information providing server in real time, collects information on the weather condition of the driving route 210 from a server of a weather center in real time, and collects information on the road type and the road curvature of the driving route 210 from a road information providing server in real time. Various other types of driving characteristic and methods of acquiring the driving characteristic may be used without departing from the spirit and scope of the illustrative examples described.

In an example, the driving information estimation apparatus 201 uses an adaptive neuro-fuzzy inference system (ANFIS) 203 to generate relative locations of points 0, x, x+1 through N−1, and N on the driving route 210 and speed deviations corresponding to each of the points 0, x, x+1 through N−1, and N based on the driving characteristic. The relative location is a parameter used to set points on a driving route. The relative location is represented as, for example, an index or a percentage between 0% and 100% from a point of departure to a destination on the driving route. The driving information estimation apparatus 201 generates a speed deviation δS corresponding to the relative location using the ANFIS 203, and generates a predicted speed corresponding to the relative location based on the speed deviation δS and an average speed Sn. An example of generating a speed deviation using the ANFIS 203 will also be described with reference to FIG. 3A.

Figure 3A:
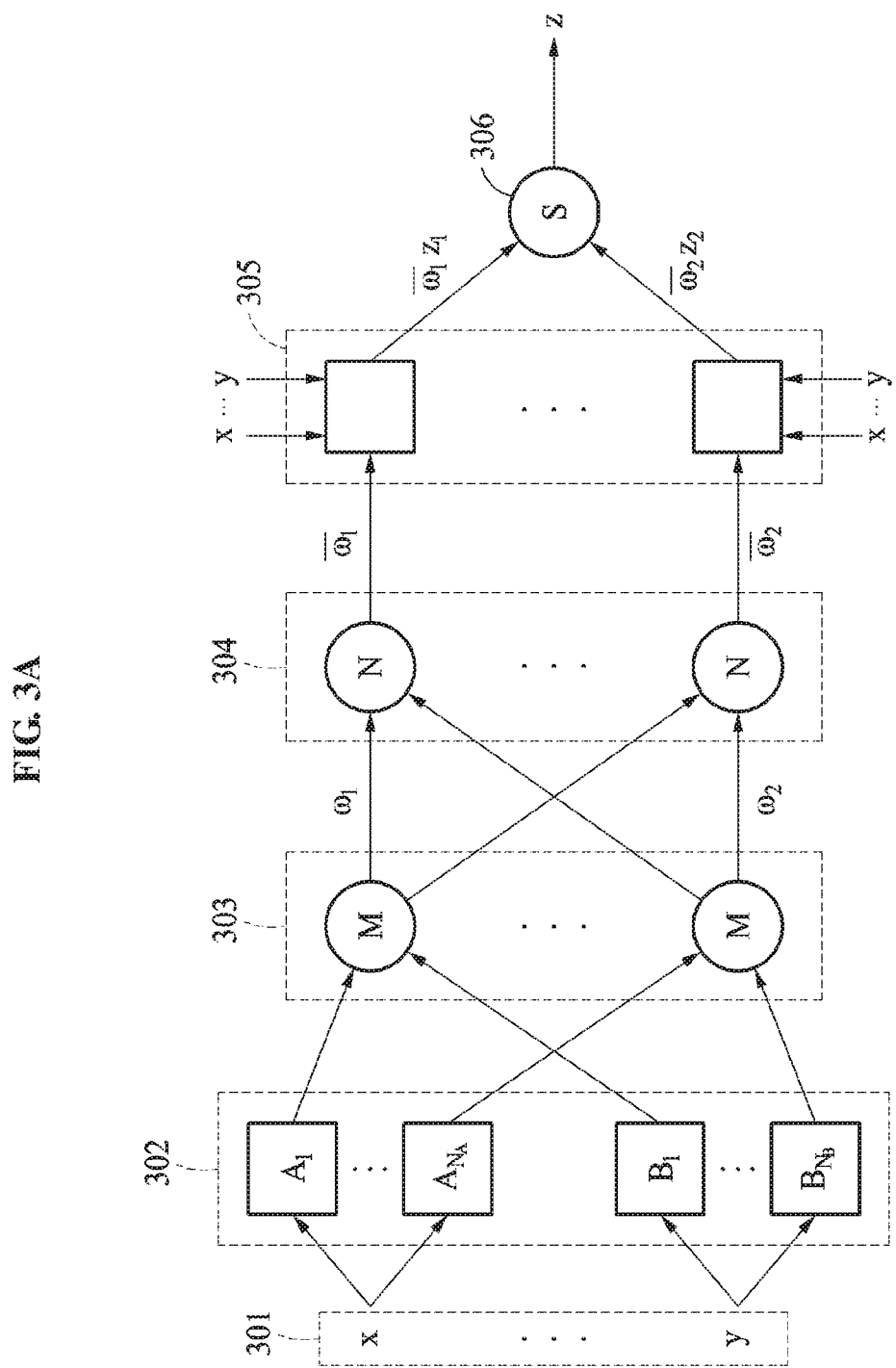
FIG. 3A illustrates an example of an operation of estimating driving information.

FIG. 3A illustrates an example of an operation of estimating driving information.

A driving information estimation apparatus estimates a speed deviation using an ANFIS. In an example, the ANFIS is an artificial neural network combined with a fuzzy inference model, and may be implemented as an artificial neural network trained on an inference method using a fuzzy inference model based on a learning algorithm. The fuzzy inference model generates a fuzzy rule based on an input and output data set and includes, for example, a Mamdani-type fuzzy inference model and a Sugeno-type fuzzy inference model. FIG. 3A illustrates an example of the ANFIS, and a structure of the ANFIS adopted by the driving information estimation apparatus. Depending on examples, various structures of the ANFIS may be used without departing from the spirit and scope of the illustrative examples described.

Referring to FIG. 3A, the ANFIS includes an input layer 301, a fuzzification layer 302, a rule layer 303, a normalization layer 304, a defuzzification layer 305, and an output layer 306. The driving information estimation apparatus processes an operation to allow relative locations of points on a driving route and a driving characteristic to be applied to the input layer 301, and generates speed deviations based on an output z generated by the output layer 306. In FIG. 3A, x through y are inputs applied to the input layer 301, $A_1$ through $A_{NA}$ are membership functions associated with the input x, and $B_1$ through $B_{NB}$ are membership functions associated with the input y. Nodes of the fuzzification layer 302 are defined based on membership functions, and apply outputs related to the membership functions to nodes M of the rule layer 303. The nodes M of the rule layer 303 apply outputs ω1 through ω2 based on a learned rule to nodes N of the normalization layer 304. The nodes N of the normalization layer 304 apply outputs $\bar{\omega}_1$ through $\bar{\omega}_2$ of normalizations to nodes of the defuzzification layer 305. The nodes of the defuzzification layer 305 apply outputs $\bar{\omega}_1 z_1, \ldots, \bar{\omega}_2 z_2$ of defuzzifications to a node of the output layer 306 based on the initial input x through y and the inputs applied from the defuzzification layer 305. The node of the output layer 306 generates the output z based on the inputs applied from the defuzzification layer 305. The node of the output layer 306 may be a single node and generate the output z by obtaining a sum of the inputs applied from the defuzzification layer 305. As discussed above, various structures and forms of layers and nodes of the ANFIS are applicable without departing from the spirit and scope of the illustrative examples described.

The ANFIS is defined based on a membership function of the relative location or the driving characteristic. The nodes of the fuzzification layer 302 are defined based on the driving characteristic or the membership function of the relative location. In an example, the driving characteristic includes at least one of a driver type, a traffic flow, a weather condition, a road type, or a road curvature. When the input x is an input representing the road type, $A_1$ through $A_{NA}$ are membership functions of the road type, and the nodes of the fuzzification layer 302 are defined based on the membership functions of the road type. When the input y is an input representing the relative location, $B_1$ through $B_{NB}$ are membership functions of the relative location and the nodes of the fuzzification layer 302 are defined based on the membership functions of the relative location. Likewise, the nodes of the fuzzification layer 302 are defined based on the membership functions of the driver type, the traffic flow, the weather condition, the road type, and the road curvature so as to generate outputs based on membership functions designed in advance. The driving information estimation apparatus uses the ANFIS, which is defined based on the driving characteristic, the membership functions, and the relative location to generate relative locations of points on the driving route and speed deviations corresponding to the relative locations based on the driving characteristic. An example of the membership functions will also be described with reference to FIGS. 4A through 4F.

The driving information estimation apparatus acquires the driving characteristic of the driving route and generates sub-driving-characteristics corresponding to the relative locations based on the acquired driving characteristic. The sub-driving-characteristic is a driving characteristic distinguished for each of the relative locations on the driving route. The driving information estimation apparatus extracts the sub-driving-characteristics corresponding to the relative locations from the driving characteristic or acquires pre-classified sub-driving-characteristics from an external source. When the relative locations on the driving route are each represented as a value of a real number between 0 and 1, the driving information estimation apparatus acquires a sub-driving-characteristics corresponding to a value of 0.5. Using the ANFIS, the driving information estimation apparatus generates a speed deviation corresponding to a relative location among the relative locations based on the relative location and a sub-driving-characteristic corresponding to the predetermined relative location. Referring to FIG. 3A, the driving information estimation apparatus applies a relative location of 0.5 and sub-driving-characteristics of the relative location of 0.5 to the inputs x through y of the input layer 301, and generates a speed deviation corresponding to the relative location of 0.5 based on an output of the ANFIS. Through an iteration of such operation, the driving information estimation apparatus generates speed deviations corresponding to relative locations of values between 0 and 1 using ANFIS. The nodes of the fuzzification layer 302 are defined based on at least one of the membership function of the relative location or the membership function of the driving characteristic.

In an example, the driving information estimation apparatus generates an output vector representing the speed deviations based on a first input vector representing the relative locations and a second input vector representing the sub-driving-characteristics using the ANFIS. For example, the driving information estimation apparatus generates an input vector of relative locations represented as values of real numbers between 0 and 1. The driving information estimation apparatus generates the second input vector of the sub-driving-characteristics corresponding to the relative locations. Referring to FIG. 3A, the driving information estimation apparatus applies the first input vector and the second input vector to the inputs x through y of the input layer 301, and generates the output vector representing the speed deviations based on the output of the ANFIS. As such, the driving information estimation apparatus generates the speed deviations corresponding to the relative locations of the values between 0 and 1 using the ANFIS without iteration.

The driving information estimation apparatus determines a number of points on the driving route based on a length of the driving route. The driving information estimation apparatus compares the length of the driving route to a threshold length and determines the number of points on the driving route based on a comparison result. The driving information estimation apparatus compares the length of the driving route to threshold lengths, selects a range to which the length of the driving route belongs from ranges defined as the threshold lengths, and determines the number of points corresponding to the selected range. According to an increase in the length of the driving route, the driving information estimation apparatus increases the number of points on the driving route. The driving information estimation apparatus sets points on the driving route based on the determined number of points. The driving information estimation apparatus generates speed deviations based on the set points using the methods described herein.

The driving information estimation apparatus compares the length of the driving route to the threshold length and divides the driving route into sub-driving-routes. In an example, when it is determined that the length of the driving route is greater than the threshold length, the driving information estimation apparatus divides the driving route into the sub-driving-routes by the amount that the driving route is greater than the threshold length. When the length of the driving route is 110 kilometers (km) and the threshold length is 100 km, the driving information estimation apparatus divides the driving route by the number corresponding to the threshold length, for example, 10 and generates the sub-driving-routes. The driving information estimation apparatus generates speed deviations corresponding to points on a sub-driving-route among the sub-driving-routes. Through an iteration of such operation, the driving information estimation apparatus generates the speed deviations associated with the sub-driving-routes. The iteration may be performed by, for example, the number of the sub-driving-routes. The driving information estimation apparatus generates the speed deviations corresponding to the relative locations, for example, indices, of the aforementioned set points using the ANFIS.

The ANFIS may be trained using a learning algorithm based on methods such as, for example, at least one of a least-squares estimation and a gradient descent method or a combination thereof. Each of the layers may be trained when a training set of the relative location and the driving characteristic are input to the ANFIS. Through a learning process, the ANFIS may be optimized so as to be defined by the membership functions. Embodiments related to the learning process are not limited to the aforementioned example, and learning processes based on various methods or schemes are applicable without departing from the spirit and scope of the illustrative examples described.

Figure 3B:
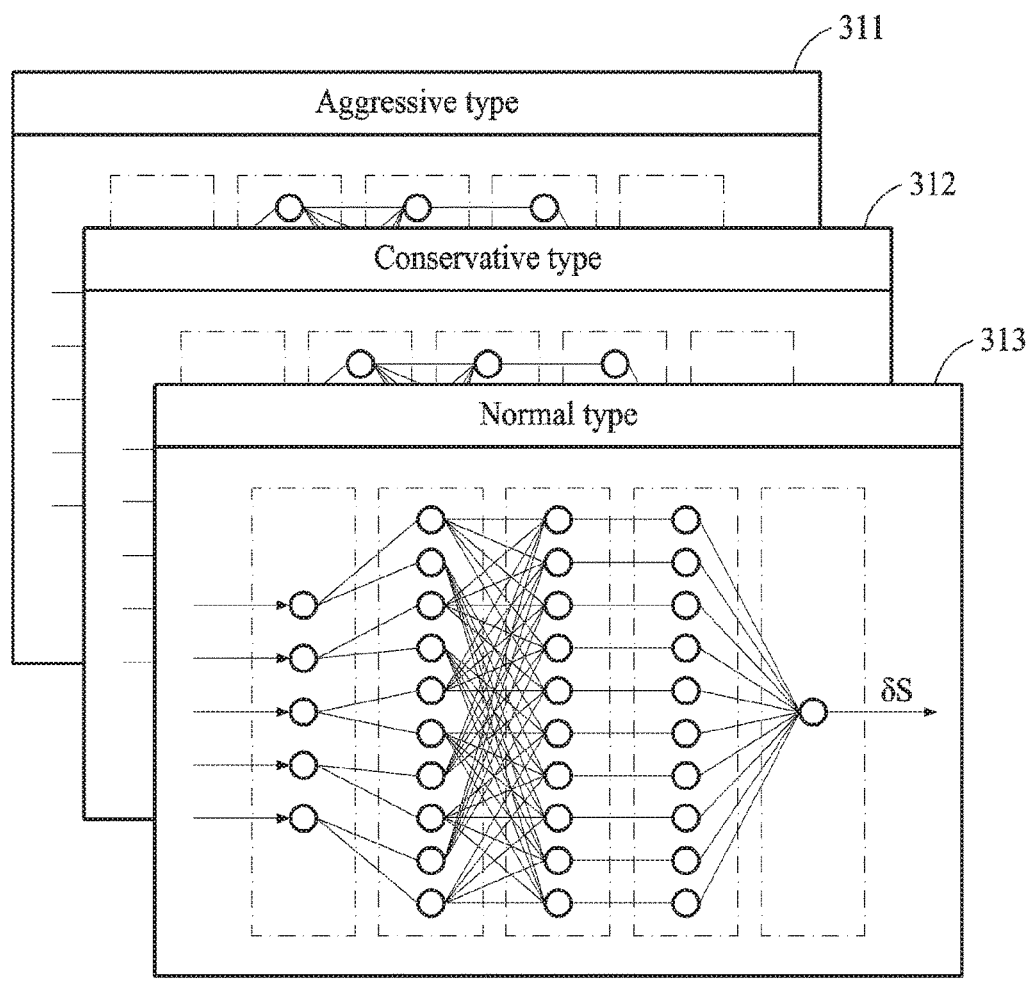
FIG. 3B illustrates an example of an operation of estimating driving information based on a driver type.

FIG. 3B illustrates an example of an operation of estimating driving information based on a driver type.

An ANFIS includes ANFISs corresponding to membership functions of a driver type. Referring to FIG. 3B, the ANFIS includes ANFISs 311, 312, and 313 corresponding to membership functions of an aggressive type, a conservative type, and a normal type, respectively.

In an example, a driving information estimation apparatus classifies a driver type, selects an ANFIS based on the driver type, and generates a speed deviation using the selected ANFIS. The driving information estimation apparatus acquires a road type associated with a driving route, and generates sub-road-types corresponding to relative locations on the driving route based on the road type. A sub-road-type indicates a road type distinguished for each of the relative locations on the driving route. In an example, the driving information estimation apparatus extracts the sub-road-types corresponding to the relative locations based on the road type. In an example, the driving information estimation apparatus acquires pre-classified sub-road-types from an external source. The driving information estimation apparatus selects an ANFIS corresponding to a membership function from the membership functions of the driver type based on a sub-road-type corresponding to a relative location among the relative locations on the driving route.

In an example, when the relative locations on the driving route are represented as values of real numbers between 0 and 1, the driving information estimation apparatus acquires a sub-road-type corresponding to a relative location of 0.1. In this example, the driving information estimation apparatus selects the driver type as the aggressive type based on the sub-road-type corresponding to the relative location of 0.1. The driving information estimation apparatus selects the ANFIS 311 corresponding to the membership function of the aggressive type to generate the speed deviation. To classify the driver type, the driving information estimation apparatus uses a speed distribution of a driver based on a road type of a relative location. The speed distribution may be a statistical speed distribution of a driver in a road type, and may also be a statistical speed distribution of a plurality of drivers in a road type. The driving information estimation apparatus classifies the driver type as represented by Table 1 below.

TABLE 1

| | Local type | Local highway type | Highway type |
| --- | --- | --- | --- |
| Aggressive type | $\mu < 9$ | $\mu < 26$ | $\mu < 53$ |
| Normal type | $9 \leq \mu < 11$ | $26 \leq \mu < 30$ | $53 \leq \mu < 57$ |
| Conservative type | $\mu \geq 9$ | $\mu \geq 30$ | $\mu \geq 57$ |

In Table 1, $\mu$ denotes a speed of a driver. Also, a local type, a local highway type, and a highway type correspond to the road type and a conservative type, a normal type, and an aggressive type correspond to the driver type. $\mu$ may be a statistical average speed of a driver in a particular road type. Thresholds to be compared to $\mu$ are set based on a value of a normal distribution of speeds of a plurality of drivers in the road type. As shown in Table 1, in an example, the driving information estimation apparatus stores a classification rule of the driver type based on the road type as a database. When a road type corresponding to a relative location is the local type and $\mu$ of the driver in the local type is 7, the driving information estimation apparatus selects the ANFIS 311 corresponding to the membership function of the aggressive type. The driving information estimation apparatus generates a relative location and a speed deviation corresponding to the relative location based on the sub-road-type using the selected ANFIS. By using a selected ANFIS, the driving information estimation apparatus generates a relative location and a speed deviation corresponding to the relative location based on a driving characteristic. The speed deviation may be generated based on the examples described herein.

Figure 3C:
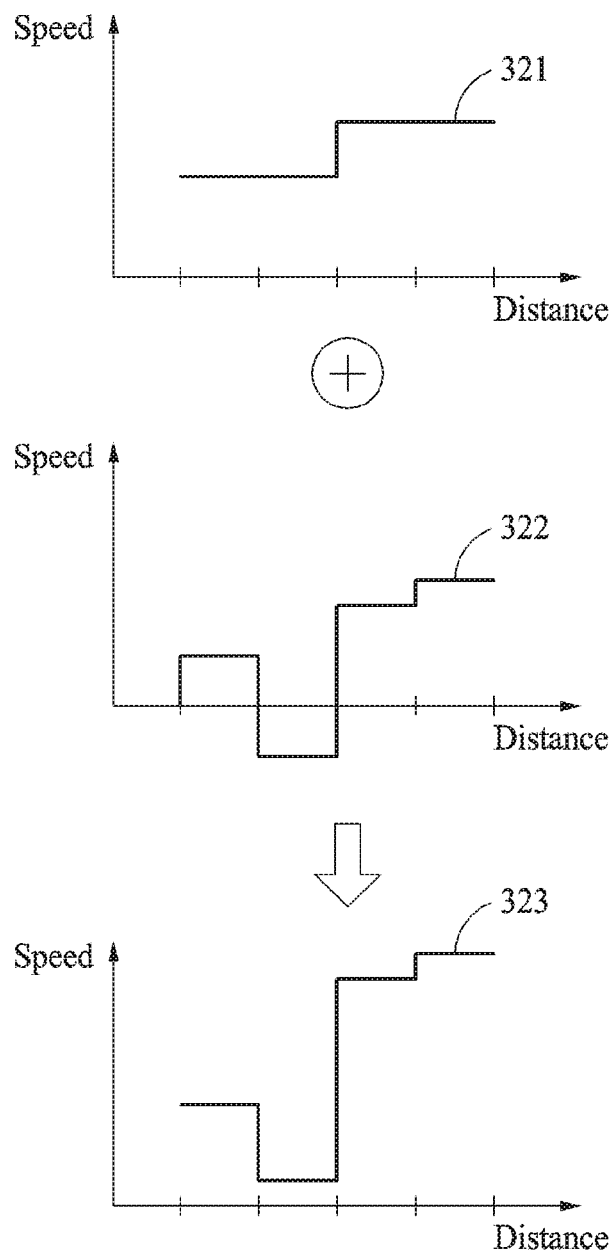
FIG. 3C illustrates an example of an operation of generating a speed profile.

FIG. 3C illustrates an example of an operation of generating a speed profile.

A driving information estimation apparatus obtains a sum of average speeds 321 and speed deviations 322 corresponding to points on a driving route and generates predicted speeds 323 corresponding to the points on the driving route. The driving information estimation apparatus generates a speed profile that is a sequence of the predicted speeds 323. A calculation method used to generate the predicted speeds 323 is not limited to an addition and various methods may be used without departing from the spirit and scope of the illustrative examples described.

Figure 4A:
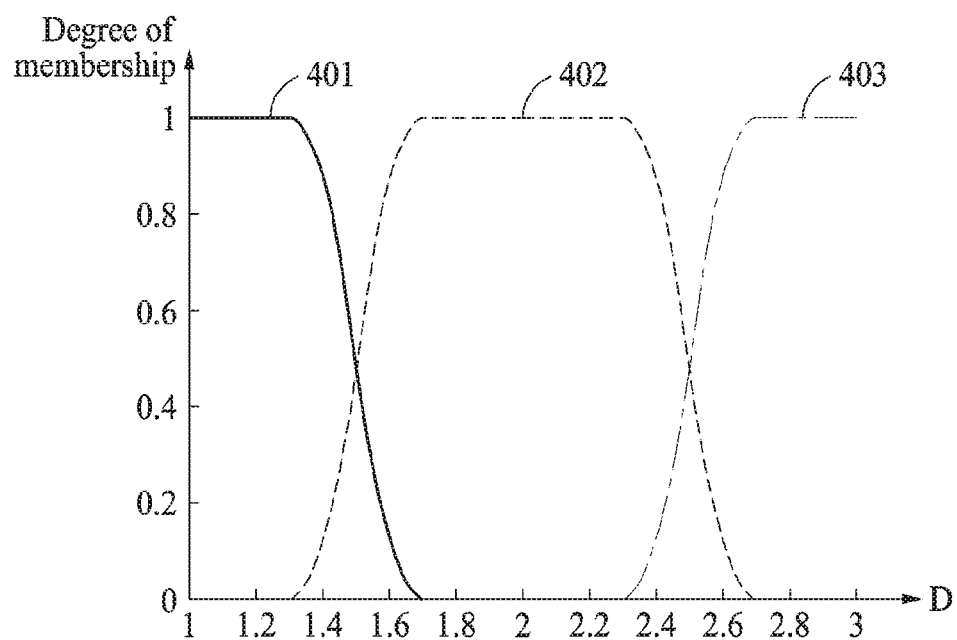
FIG. 4A illustrates an example of a membership function of a driver type.

FIG. 4A illustrates an example of a membership function of a driver type.

Referring to FIG. 4A, a membership function of a driver type includes a membership function 401 corresponding to a conservative type, a membership function 402 corresponding to a normal type, and a membership function 403 corresponding to an aggressive type. As explained above, a driving information estimation apparatus generates speed deviations of points on a driving route using an ANFIS defined based on the membership functions of the driver type. In an example, the ANFIS includes a fuzzification layer defined based on the membership functions of the driver type. The membership functions 401 through 403 of the driver type may be functions representing the driver type, and set based on a statistical distribution related to the driver type. The membership functions 401 through 403 of the driver type output degrees of memberships of the conservative type, the normal type, and the aggressive type in response to an input D representing the driver type.

The membership functions of the driver type are defined, for example, according to Equation 2.

$$\mu_{I_C}(D) = \begin{cases} 1 & \text{if } D < a_1 \\ \frac{D - a_2}{a_2 - a_1} & \text{if } a_1 \leq D < a_2 \\ 0 & \text{if } D \geq a_2 \end{cases}$$ [Equation 2]

$$\mu_{I_N}(D) = \begin{cases} 0 & \text{if } D < a_1 \\ \frac{D - a_1}{a_2 - a_1} & \text{if } a_1 \leq D < a_2 \\ 1 & \text{if } a_2 \leq D < a_3 \\ \frac{D - a_4}{a_3 - a_4} & \text{if } a_3 \leq D < a_4 \\ 0 & \text{if } D \geq a_4 \end{cases}$$

$$\mu_{I_A}(D) = \begin{cases} 0 & \text{if } D < a_3 \\ \frac{D - a_3}{a_4 - a_3} & \text{if } a_3 \leq D < a_4 \\ 1 & \text{if } D \geq a_4 \end{cases}$$

In Equation 2, D denotes an input representing the driver type, $\mu_{I_C}(D)$, $\mu_{I_N}(D)$, and $\mu_{I_A}(D)$ respectively denote membership functions of the conservative type, the normal type, and the aggressive type, $a_1$ through $a_4$, each being a constant. The constants $a_1$ through $a_4$ are set based on a statistical distribution related to the driver type. An output of each of the membership functions is the degree of membership of the corresponding type.

Figure 4B:
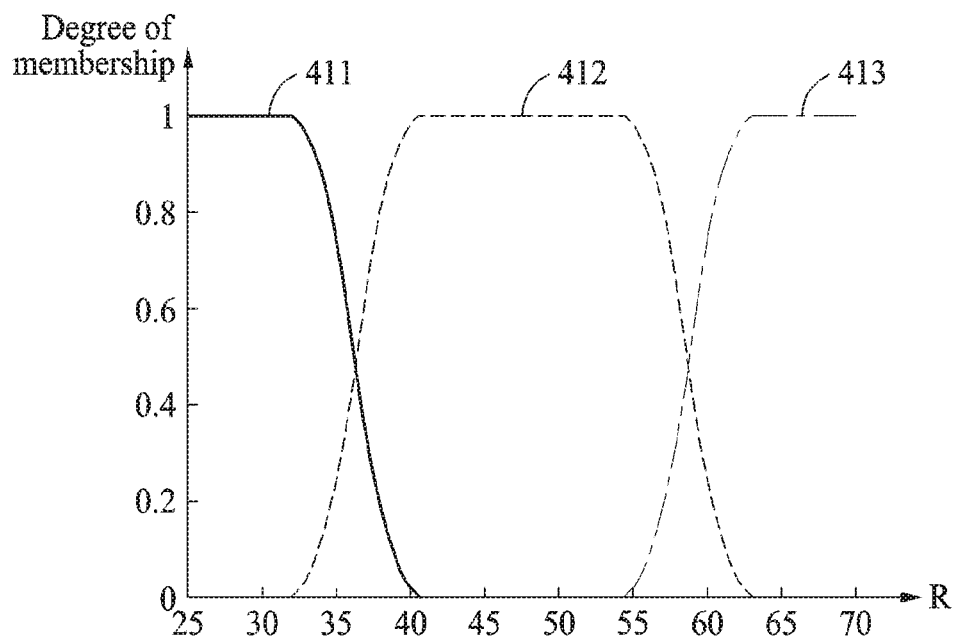
FIG. 4B illustrates an example of a membership function of a road type.

FIG. 4B illustrates an example of a membership function of a road type.

Referring to FIG. 4B, a membership function of a road type includes a membership function 411 corresponding to a local type, a membership function 412 corresponding to a local highway type, and a membership function 413 corresponding to a highway type. As explained above, a driving information estimation apparatus generates speed deviations of points on a driving route using an ANFIS defined based on the membership functions of the road type. In this example, the ANFIS includes a fuzzification layer defined based on the membership functions of the road type. The membership functions 411 through 413 of the road type may be functions representing the road type and set based on a feature related to the road type and a speed limit. The membership functions 411 through 413 of the road type output degrees of memberships of the local type, the local highway type, and the highway type in response to an input R representing the road type. The membership functions of the road type are defined similarly to Equation 2.

Figure 4C:
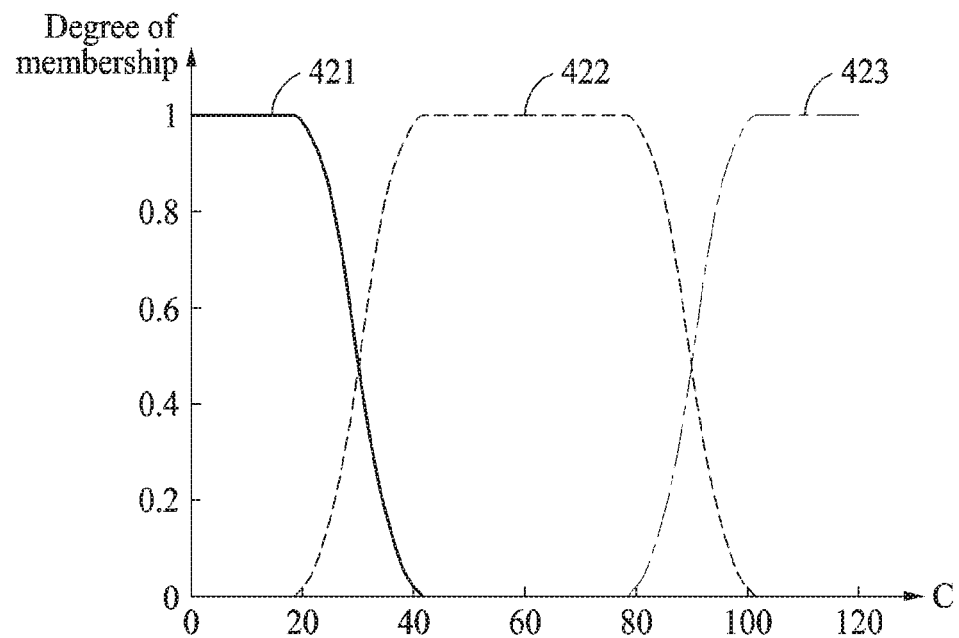
FIG. 4C illustrates an example of a membership function of a road curvature.

FIG. 4C illustrates an example of a membership function of a road curvature.

Referring to FIG. 4C, a membership function of a road curvature includes a membership function 421 corresponding to a small curvature, a membership function 422 corresponding to a medium curvature, and a membership function 423 corresponding to a large curvature. As explained above, a driving information estimation apparatus generates speed deviations of points on a driving route using an ANFIS defined based on the membership functions of the road curvature. In this example, the ANFIS includes a fuzzification layer defined based on the membership functions of the road curvature. The membership functions 421 through 423 of the road curvature may be functions representing the road curvature, and set based on a feature related to the road curvature. In an example, the membership functions 421 through 423 are defined to output, for example, values between zero and 120 degrees (°). The membership functions 421 through 423 of the road curvature output degrees of memberships of the small curvature, the medium curvature, and the large curvature in response to an input C representing the road curvature. The membership functions of the road curvature are defined similarly to Equation 2.

Figure 4D:
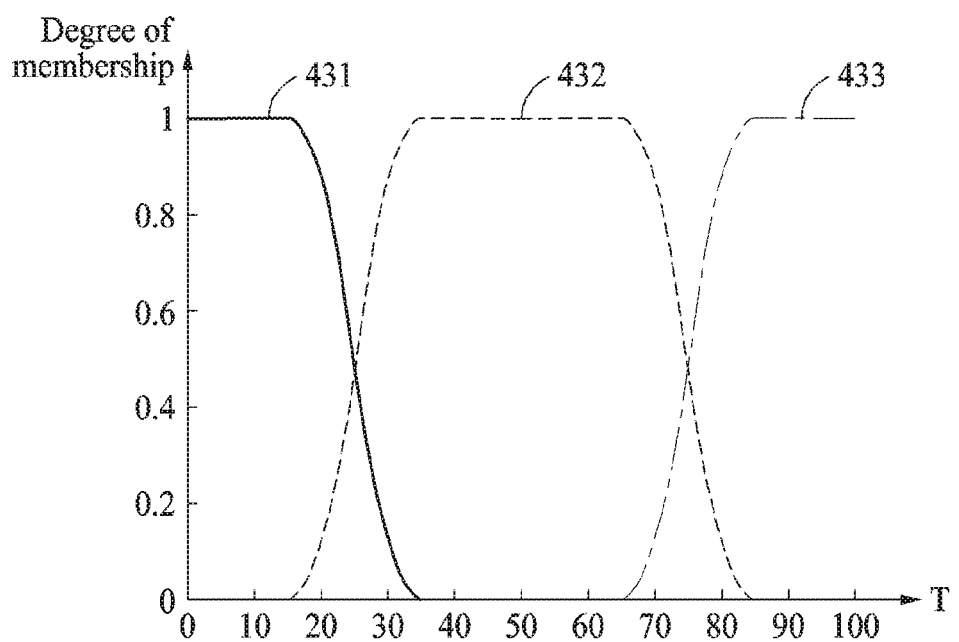
FIG. 4D illustrates an example of a membership function of a traffic flow.

FIG. 4D illustrates an example of a membership function of a traffic flow.

Referring to FIG. 4D, a membership function of a traffic flow includes a membership function 431 corresponding to a light flow, a membership function 432 corresponding to a medium flow, and a membership function 433 corresponding to a heavy flow. As explained above, a driving information estimation apparatus generates speed deviations of points on a driving route using an ANFIS defined based on the membership functions of the traffic flow. In this example, the ANFIS includes a fuzzification layer defined based on the membership functions of the traffic flow. The membership functions 431 through 433 of the traffic flow may be functions representing the traffic flow and set based on, for example, a speed limit of a road and an actual speed. The membership functions 431 through 433 of the traffic flow output degrees of memberships of the light flow, the medium flow, and the heavy flow in response to an input T representing the traffic flow. The membership functions of the traffic flow are defined similarly to Equation 2.

Figure 4E:
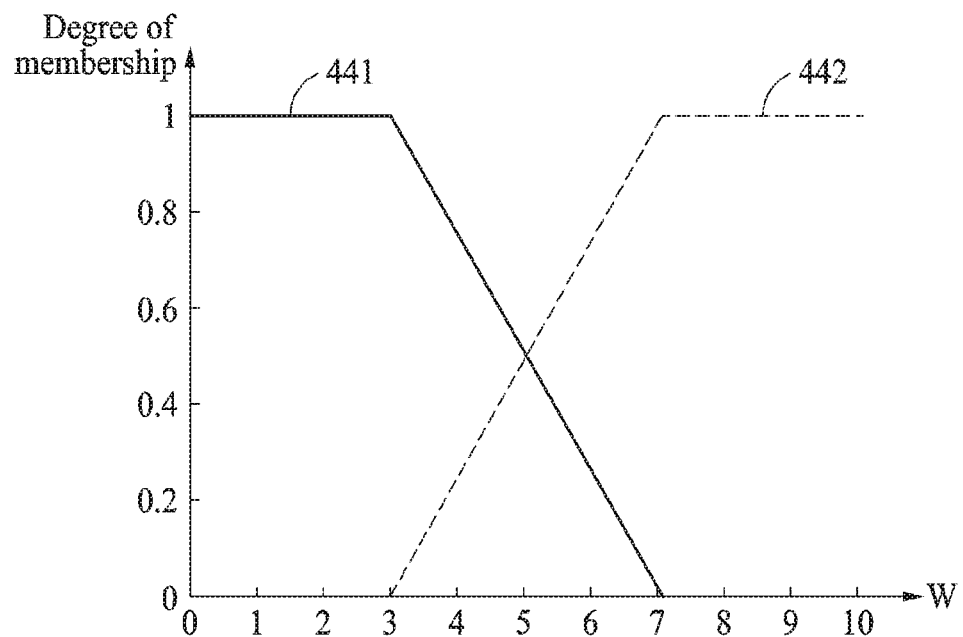
FIG. 4E illustrates an example of a membership function of a weather condition.

FIG. 4E illustrates an example of a membership function of a weather condition.

Referring to FIG. 4E, a membership function of a weather condition includes a membership function 441 corresponding to a clear weather condition and a membership function 442 corresponding to a wet weather condition. As explained above, a driving information estimation apparatus generates speed deviations of points on a driving route using an ANFIS defined based on the membership functions of the weather condition. In this example, the ANFIS includes a fuzzification layer defined based on the membership functions of the weather condition. The membership functions 441 and 442 of the weather condition may be functions representing the weather condition and set based on, for example, a precipitation of a road. The membership functions 441 and 442 of the weather condition output degrees of memberships of the clear weather condition and the wet weather condition in response to an input W representing the weather condition.

The membership functions of the weather condition are defined, for example, according to Equation 3.

$$\mu_{NR}(W) = \begin{cases} 1 & \text{if } W < b_1 \\ \dfrac{W-b_2}{b_1-b_2} & \text{if } b_1 \le W < b_2 \\ 0 & \text{if } W \ge b_2 \end{cases} \quad [\text{Equation 3}]$$

$$\mu_{WR}(W) = \begin{cases} 0 & \text{if } W < b_1 \\ \dfrac{W-b_1}{b_2-b_1} & \text{if } b_1 \le W < b_2 \\ 1 & \text{if } W \ge b_2 \end{cases}$$

In Equation 3, W denotes an input representing the weather condition, and $\mu_{NR}(W)$ and $\mu_{WR}(W)$ respectively denote membership functions of the clear weather condition and the wet weather condition, $b_1$ and $b_2$, each being a constant. The constants $b_1$ and $b_2$ are set based on a statistical distribution related to the weather condition. An output of each of the membership functions is a degree of membership of the corresponding weather condition.

Figure 4F:
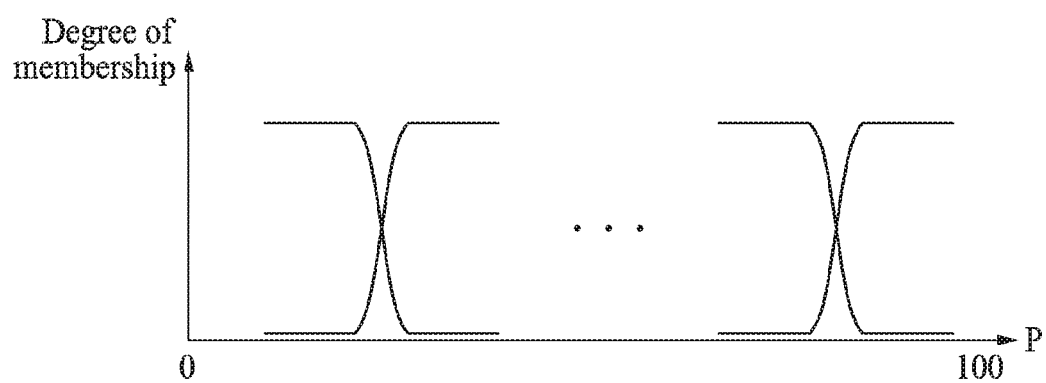
FIG. 4F illustrates an example of a membership function of a relative location.

FIG. 4F illustrates an example of a membership function of a relative location.

Referring to FIG. 4F, a membership function corresponding to a relative location includes membership functions corresponding to a plurality of relative locations. For example, the membership functions may be designed such that points on a driving route indicate degrees of memberships of values expressed by percentages between 0 and 100%, starting from a point of departure to a destination. As explained above, a driving information estimation apparatus generates speed deviations of the points on the driving route using an ANFIS defined based on the membership functions of the relative locations. In this example, the ANFIS includes a fuzzification layer defined based on the membership functions of the relative locations. The membership functions of the relative locations may be functions for determining the points on the driving route and set to output values of, for example, real numbers between 0 and 1. In an example, the number of the membership functions is defined based on the number of points on the driving route. For example, the number of points on the driving route is the same as the number of the membership functions of the relative locations. The membership functions of the relative locations output degrees of memberships in response to an input P representing the relative location. The membership functions of the relative locations are defined similarly to the foregoing examples.

Figure 5:
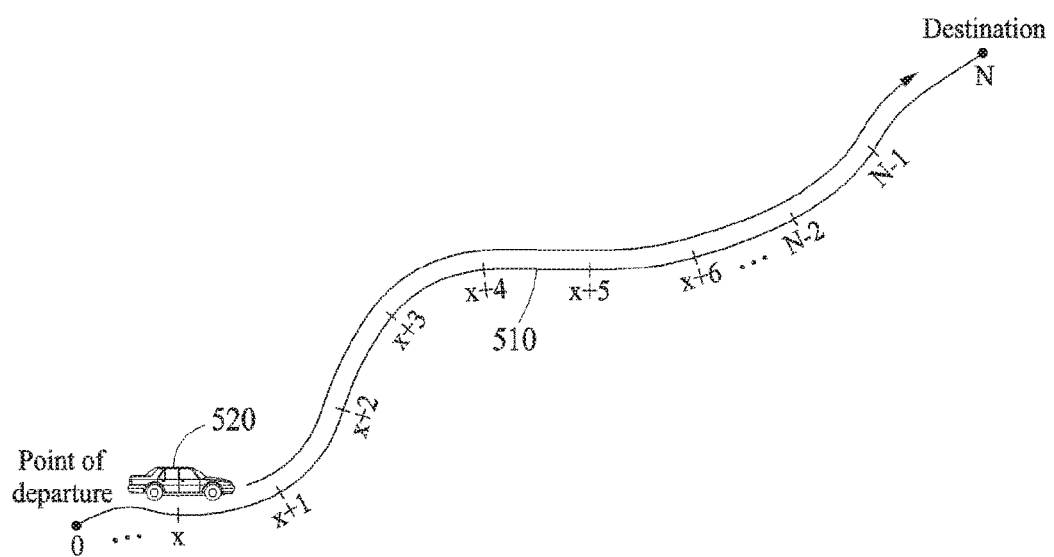
FIG. 5 illustrates an example of driving related information generated based on a speed profile.
Figure 6:
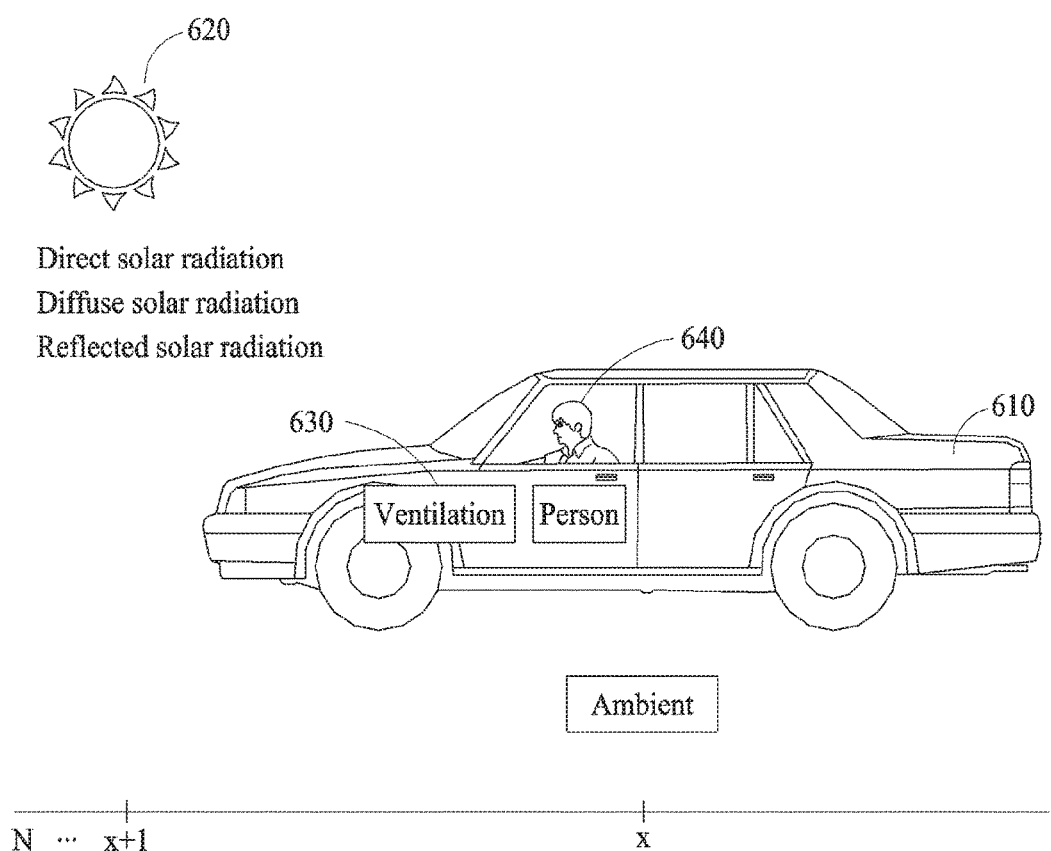
FIG. 6 illustrates an example of driving related information generated based on a speed profile.

FIGS. 5 and 6 illustrate examples of driving related information generated based on a speed profile.

An example of driving related information indicates an amount of power to be used by a vehicle during driving.

In an example, the amount of power to be used by the vehicle during driving includes $E_{PT}(t)$ and/or $E_{HVAC}(t)$. $E_{PT}(t)$ denotes a predicted amount of power to be transferred from a battery pack of the vehicle to a powertrain during driving of the vehicle, and $E_{HVAC}(t)$ denotes a predicted amount of power to be used by an air conditioning system of the vehicle during driving of the vehicle. Hereinafter, $E_{PT}(t)$ will be described with reference to FIG. 5, and $E_{HVAC}(t)$ will be described with reference to FIG. 6.

Referring to FIG. 5, a vehicle 520 is driven along a route 510.

It is assumed that the vehicle 520 is passing a current point x. The vehicular information estimation apparatus calculates $E_{PT}(t)$ by applying the speed profile to a power consumption calculation function. In an example, the vehicular information estimation apparatus predicts an amount of power to be used by the vehicle 520 for driving from the current point x to a destination as $E_{PT}(t)$. The power consumption calculation function will be described below.

In an example, the vehicular information estimation apparatus calculates $E_{PT}(t)$ further based on a predicted value with respect to at least one of a wind direction, a wind speed, or an altitude of a succeeding point. In an example, a predicted value with respect to the wind direction and the wind speed of the succeeding point is calculated based on wind direction information and wind speed information of the current point, and a predicted value of the altitude of the succeeding point. In an example, the altitude of the succeeding point is calculated based on altitude information of the current point. The vehicular information estimation apparatus calculates $E_{PT}(t)$ as expressed by, for example, Equation 4.

$$E_{PT}(t) = \sum_{i=x+1}^{N} f_{i,t}^{pt}\left(g_{i,t}, \hat{W}_{i,t}, \hat{El}_{i,t}\right) \quad [\text{Equation 4}]$$

In Equation 4, $g_{i,t}$ denotes a speed of a vehicle at a succeeding point i, calculated at a time t. In an example, $g_{i,t}$ denotes the second speed profile described above. $\hat{W}_{i,t}$ denotes a predicted value with respect to a wind direction and a wind speed of the succeeding point i, calculated at the time t. $\hat{El}_{i,t}$ denotes a predicted value with respect to an altitude of the succeeding point i, calculated at the time t. $f_{i,t}^{pt}(\ )$ denotes a power consumption calculation function. For example, $f_{i,t}^{pt}(\ )$ denotes a function to calculate an amount of power to be transferred to a powertrain in a section between a current point i−1 and the succeeding point i.

In the example of FIG. 5, the vehicular information estimation apparatus calculates, at a point x, at least one of a wind direction (predicted value), a wind speed (predicted value), or an altitude (predicted value) of a point x+1. The vehicular information estimation apparatus calculates a predicted amount of power to be transferred to the powertrain in a section between the point x and the point x+1 by applying a speed (predicted value) of the vehicle at the point x+1 and at least one of the wind direction (predicted value), the wind speed (predicted value), or the altitude (predicted value) of the point x+1 to $f_{i,t}^{Pt}()$. The vehicular information estimation apparatus calculates a predicted amount of power to be transferred to the powertrain, with respect to another section. The vehicular information estimation apparatus calculates $E_{PT}(t)$ by summing up the predicted values calculated with respect to respective sections, for example, between x and x+1, x+1 and x+2, . . . , N−1 and N.

According to an example, the vehicular information estimation apparatus considers various variables to increase the accuracy of $E_{PT}(t)$. For example, the vehicular information estimation apparatus calculates $E_{PT}(t)$ as expressed by Equation 5.

$$E_{PT}(t) = \sum_{i=x+1}^{N} f_{i,t}^{Pt}\left(g_{i,t}, (u_x^s, \hat{u}_{i,t}^s, h_C(\hat{u}_{i,t}), h_p(\hat{u}_{i,t})), \hat{W}_{i,t}, \widehat{El}_{i,t}\right) \quad \text{[Equation 5]}$$

where $u_x^s = \{L_x, F_x, C_x, W_x, P_x, S_x\}$

Table 2 shows descriptions of variables and functions of Equation 5.

TABLE 2

| | Description |
|---|---|
| $L_i$ | Reference speed of point i |
| $F_i$ | Driving speed at point i |
| $El_i$ | Altitude of point i |
| $C_i$ | Precipitation of point i |
| $W_i$ | Wind speed/wind direction of point i |
| $P_i$ | Instant power transferred to powertrain at point i |
| $S_i$ | SOC calculated at point i |
| $u_i^s$ | Speed related information at point i |
| $\hat{u}_{i,t}$ | Predicted value calculated at time t |
| $h_C()$ | Driving record function for each road type |
| $h_p()$ | Driving record function for each driver |
| $g_{i,t}()$ | Function to calculate predicted value of speed of vehicle at point i |
| $f_{i,t}^{Pt}()$ | Power consumption calculation function |

In Equation 5, speed related information $u_x^s$ at the current point x includes a reference speed at the current point x, a driving speed of the vehicle 520 at the current point x, a precipitation of the current point x, a wind speed/wind direction of the current point x, an amount of instant power transferred to the powertrain at the current point x, and a state of charge (SOC) at the current point x. However, the speed related information is not limited thereto, and other speed related information such as, for example, state of health (SOHC) at the current point x are considered to be well within the scope of the present disclosure. According to an example, $u_x^s$ may include at least one of the reference speed at the current point x, the driving speed of the vehicle 520 at the current point x, the precipitation of the current point x, the wind speed/wind direction of the current point x, the amount of instant power transferred to the powertrain at the current point x, or the SOC at the current point x.

In Equation 5, $\hat{u}_{i,t}^s$ denotes a predicted value calculated at a current time T with respect to speed related information at the succeeding point i. For example, $\hat{u}_{i,t}^s$ includes a predicted value calculated at the time t with respect to at least one of a precipitation of the succeeding point i, a driving speed of the vehicle 520 at the succeeding point i, a wind speed/wind direction of the succeeding point i, an amount of instant power to be transferred to the powertrain at the succeeding point i, or an SOC at the succeeding point i.

In Equation 5, $\hat{u}_{i,t}$ includes at least one of information in $\hat{u}_{i,t}^s$ or information in $\hat{u}_{i,t}^w$ which will be described with reference to FIG. 6.

In Equation 5, driving records stored for each road type and each driver are used to calculate a predicted value with respect to a speed of the vehicle 520 at the succeeding point i. In an example, the vehicular information estimation apparatus stores the driving records of the vehicle 520 for each road type, and generates a driving record function $h_C()$ for each road type. For example, the vehicular information estimation apparatus generates a driving record function of a local type, a driving record function of a local highway type, and a driving record function of a highway type. Further, the vehicular information estimation apparatus stores driving records of the vehicle 520 for each driver, and generates a driving record function $h_p()$ for each driver. The vehicular information estimation apparatus uses $h_C()$ and $h_p()$ to calculate a predicted value with respect to the speed of the vehicle 520 at the succeeding point i.

In the example of FIG. 5, the vehicular information estimation apparatus calculates a predicted value with respect to the speed of the vehicle 520 at the succeeding point i, i.e., the point x+1 by applying the speed related information $u_x^s$ at the point x, the predicted value $\hat{u}_{i,t}^s$ with respect to the speed related information at the point x+1, driving records with respect to a road type, for example, a highway type, to which the point x+1 belongs, and the driving records with respect to a current driver to $g_{i,t}()$. Since the various variables are applied to $g_{i,t}()$, the speed of the vehicle 520 at the point x+1 may be predicted more accurately.

Further, the vehicular information estimation apparatus calculates a predicted amount of power to be transferred to the powertrain in a section between x and x+1 by applying the predicted value with respect to the speed of the vehicle 520 at the point x+1 and at least one of the wind direction (predicted value), the wind speed (predicted value), or the altitude (predicted value) at the point x+1 to $f_{i,t}^{Pt}()$. Likewise, the vehicular information estimation apparatus calculates a predicted amount of power to be transferred to the powertrain with respect to another section. The vehicular information estimation apparatus calculates $E_{PT}(t)$ by summing up predicted values calculated with respect to respective sections, for example, between x and x+1, x+1 and x+2, . . . , N−1 and N. $E_{PT}(t)$ is calculated in view of various environment variables, and thus the accuracy of $E_{PT}(t)$ increases.

In an example, the vehicle 520 operates an air conditioning system. As the air conditioning system is operated, an amount of power to be used by the vehicle 520 increases. Thus, if $E_{HVAC}(t)$, an amount of power to be used by the air conditioning system during driving of the vehicle 520, is predicted, the prediction accuracy with respect to the amount of power to be used by the vehicle 520 further increases. Hereinafter, the example of calculating $E_{HVAC}(t)$ will be described below with reference to FIG. 6.

Referring to FIG. 6, a vehicle 610 and the sun 620 are illustrated and the vehicle 610 is passing a current point x.

Solar radiation and ambient temperature of the vehicle 610 influence an amount of power that is used by an air conditioning system. A vehicular information estimation apparatus calculates $E_{HVAC}(t)$ based on at least one of solar radiation information or ambient temperature information. For example, the vehicular information estimation apparatus calculates a predicted value with respect to weather related information of a succeeding point, for example, a point x+1, based on weather related information of the current point x, and calculates $E_{HVAC}(t)$ based on the weather related information of the current point x and the predicted value with respect to the weather related information of the succeeding point x+1. The weather related information includes information such as, for example, precipitation, wind condition, ambient temperature, an azimuth, and solar radiation of the sun 620. The vehicular information estimation apparatus calculates $E_{HVAC}(t)$ as expressed by, for example, Equation 6.

$$E_{HVAC}(t) = \sum_{i=x+1}^{N} f_{i,t}^{aux}(u_x^w, \hat{u}_{i,t}^w) \quad \text{[Equation 6]}$$

where $u_x^w = \{T_x, R_x\}$

Table 3 represents descriptions of variables and a function of Equation 6.

TABLE 3

| | Description |
|---|---|
| $T_i$ | Ambient temperature of point i |
| $R_i$ | Solar azimuth and radiation amount at point i |
| $u_i^w$ | Weather related information at point i |
| $f_{i,t}^{aux}()$ | Auxiliary power consumption calculation function |

$f_{i,t}^{aux}()$ denotes an auxiliary power consumption calculation function. For example, $f_{i,t}^{aux}()$ is a function to calculate a predicted value with respect to an amount of auxiliary power to be used in a section between a point i−1 and a point i, for example, an amount of power to be used by the air conditioning system.

In the example of FIG. 6, the vehicular information estimation apparatus calculates the predicted amount of power to be used by the air conditioning system in the section between x and x+1 by applying ambient temperature of the vehicle 610 at the point x, an azimuth of the sun 620 at the point x, an amount of solar radiation at the point x, ambient temperature (predicted value) of the vehicle 610 at the point x+1, an azimuth (predicted value) of the sun 620 at the point x+1, and an amount of solar radiation (predicted value) at the point x+1 to $f_{i,t}^{aux}()$. The vehicular information estimation apparatus calculates a predicted value with respect to an amount of power to be used by the air conditioning system with respect to another section in a similar manner. The vehicular information estimation apparatus calculates $E_{HVAC}(t)$ by summing up predicted values with respect to respective sections, for example, between x and x+1, x+1 and x+2, . . . , N−1 and N.

According to an example, the vehicular information estimation apparatus considers heat generated in a cabin of the vehicle 610 to increase the accuracy of $E_{HVAC}(t)$, which will be described further below.

Heat is generated in the cabin of the vehicle 610 for various reasons. For example, heat is generated in the cabin of the vehicle 610 by at least one of direct solar radiation, diffuse solar radiation, reflected solar radiation, an ambient environment of the vehicle 610, ventilation 630, or a person 640, for example, a driver and/or a passenger.

Table 4 lists types of heat generated in the cabin of the vehicle 610 and $\dot{Q}$.

TABLE 4

| | |
|---|---|
| Heat by direct radiation | $\dot{Q}_1 = \Sum_{1=0}^{Surfaces} S \times \tau \times I_{Dir} \times \cos\theta$<br>S = surface area (m²)<br>τ = surface element transmissivity<br>$I_{Dir}$ = direct radiation (W/m²)<br><br>$I_{Dir} = A/\exp\left(\frac{B}{\sin(\beta)}\right)$,<br><br>A = 1018, B = 0.207, and β = altitude angle of the sun<br>θ = sun angle |
| Heat by diffuse radiation | $\dot{Q}_2 = \Sum_{1=0}^{Surfaces} S \times \tau \times I_{Diff} \times \cos\theta$<br>$I_{Diff}$ = diffuse radiation (W/m²)<br><br>$I_{Diff} = C \times I_{Dir} \times \frac{1+\cos\varphi}{2}$<br><br>C = 0.136 and φ = angle with the horizontal surface, i.e., angle between horizontal surface at the position of vehicle and the sky |
| Heat by reflected radiation | $\dot{Q}_3 = \Sum_{1=0}^{Surfaces} S \times \tau \times I_{Ref} \times \cos\theta$<br>$I_{Ref}$ = reflected radiation (W/m²)<br><br>$I_{Ref} = (I_{Dir} + I_{Diff}) \times \rho_g \times \frac{1-\cos\varphi}{2}$,<br><br>$\rho_g$ = 0.2 (ground reflectivity coefficient) |
| Heat by ambient environment | $\dot{Q}_4 = \Sum_{1=0}^{Surfaces} S \times U \times (T_s - T)$<br>U = heat transfer coefficient (W/m²-k),<br>10 ≤ U ≤ 100<br>$T_s$ = surface temperature<br>T = cabin temperature |
| Heat by ventilation | $\dot{Q}_5 = \dot{m}_{vent} \times c_p \times (T_{init} - T)$<br>$\dot{m}_{vent}$ = ventilation mass flow rate (m³/s)<br>$c_p$ = specific heat = 1005<br>$T_{init}$ = initial cabin temperature<br>T = cabin temperature |
| Heat by person | $\dot{Q}_6 = \Sum_{i=0}^{Persons} H_{pr} \times A_{Du}$<br>$H_{pr}$ = heat production rate (W/m²) = 58.2<br>$H_{pr}$ includes $H_{pr}$ = 85 for the driver and $H_{pr}$ = 55 for the passenger.<br>$A_{Du}$ = Du Bois area(m²)<br>Average Du Bois area of Adult = 1.8 m²<br>More accurately, the Du Bois area is as follows.<br>$A_{Du} = 0.202 \times W^{0.425} \times H^{0.725}$.<br>Here, W = weight, H = height. |

The cabin temperature (or the temperature of driver seat) is determined based on Equation 7.

$$m \times C_{room} \times \frac{dT}{dt} = \dot{Q}_1 + \dot{Q}_2 + \dot{Q}_3 + \dot{Q}_4(T) + \dot{Q}_5(T) + \dot{Q}_6 \quad \text{[Equation 7]}$$

In Equation 7, m denotes a mass of the air, and $C_{room}$ denotes a specific heat of the air.

If a heat transfer efficiency is considered in Equation 7, an amount of power or energy required to maintain an optimal cabin temperature is deduced. The deduced amount of power represents $E_{HVAC}(t)$.

In an example, the vehicular information estimation apparatus predicts the amount of power to be used by the vehicle 610 as $E_{PT}(t)+E_{HVAC}(t)$. In an example, the vehicular information estimation apparatus predicts an amount of power to be used by the vehicle 610 for driving from the current point x to a destination as $E_{PT}(t)+E_{HVAC}(t)$.

The vehicular information estimation apparatus determines a driving range of the vehicle 610 based on the predicted amount of power. Here, the predicted amount of power corresponds to $E_{PT}(t)$ or $E_{PT}(t)+E_{HVAC}(t)$. However, the predicted amount of power is not limited thereto.

The vehicular information estimation apparatus determines the driving range of the vehicle 610 based on the predicted amount of power and current state information, for example, an SOC, of a battery. The vehicular information estimation apparatus predicts an SOC at a destination by deducting an SOC corresponding to the predicted amount of the power from the current SOC. In other words, the vehicular information estimation apparatus predicts a residual SOC corresponding to an SOC when the vehicle 610 reaches the destination. If the SOC at the destination is less than a threshold, for example, a value within 0 to 1%, the vehicular information estimation apparatus determines that the vehicle 610 is unable to reach the destination with the current SOC. In this example, the vehicular information estimation apparatus displays information related to a charging station located on a path that the vehicle 610 is travelling. In an example, the information related to a location of the charging station is displayed through a display of the vehicle 610. If the SOC at the destination is greater than or equal to the predetermined criterion, the vehicular information estimation apparatus displays a message indicating that the vehicle 610 is able to reach the destination with the current SOC on the display. Further, if the SOC at the destination is greater than or equal to the threshold, the vehicular information estimation apparatus determines whether the vehicle 610 is able to perform a round trip with the current SOC. If the vehicle 610 is unable to perform a round trip with the current SOC, the vehicular information estimation apparatus displays information related to a charging station located on a return path through the display.

In an example, the vehicular information estimation apparatus predicts an amount of fuel to be used by the vehicle 610 based on a speed profile. The vehicular information estimation apparatus determines the driving range of the vehicle 610 based on the predicted amount of fuel and a current amount of fuel. For example, the vehicular information estimation apparatus predicts an amount of fuel at the destination by deducting the predicted amount of fuel from the current amount of fuel. If the amount of fuel at the destination is less than a threshold, for example, a value within 0 to 1 liter (L), the vehicular information estimation apparatus determines that the vehicle 610 is unable to reach the destination with the current amount of fuel. If the vehicle 610 is unable to reach the destination with the current amount of fuel, the vehicular information estimation apparatus displays a message indicating refueling is required and/or gas station information, for example, gas station location information, on the display. If the amount of fuel at the destination is greater than or equal to the threshold, the vehicular information estimation apparatus determines whether the vehicle 610 is able to perform a round trip with the current amount of fuel. If the vehicle 610 is unable to perform a round trip with the current amount of fuel, the vehicular information estimation apparatus displays information related to a gas station located on a return path through the display.

Figure 7:
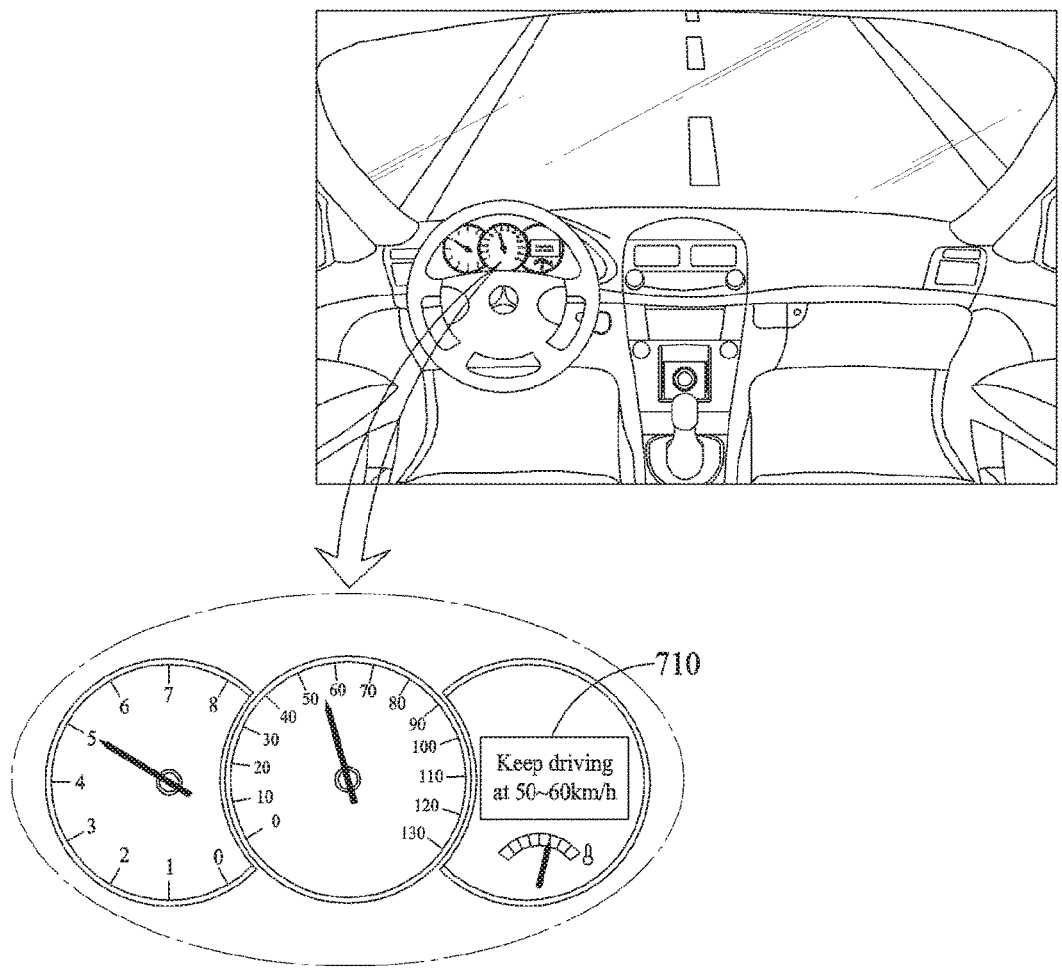
FIG. 7 illustrates an example of driving related information generated based on a speed profile.

FIG. 7 illustrates an example of driving related information generated based on a speed profile.

Another example of driving related information is guide information related to driving.

A vehicular information estimation apparatus generates guide information 710 based on a speed profile, and displays the guide information 710 on a display.

The vehicular information estimation apparatus deduces a predicted average speed in a section subsequent to a current driving section from the speed profile. For example, when a vehicle is currently being driven in a first section of a road corresponding to a highway type, the vehicular information estimation apparatus deduces a predicted average speed in a section subsequent to the first section from the speed profile. When the vehicle is driven in a section between x+1 and x+2 of the road of the highway type, the vehicular information estimation apparatus deduces a predicted average speed in a section, for example, between x+2 and x+3 or between x+2 and x+6, which is after the section between x+1 and x+2. In an example, the vehicular information estimation apparatus deduces a target speed with respect to the current driving section from driving history information, for example, a previous speed profile, a charge and discharge count of a battery, and an accident history. For example, the vehicular information estimation apparatus deduces a target speed with respect to the highway type through the driving history information. The vehicular information estimation apparatus compares the predicted average speed to the target speed. If the predicted average speed is greater than the target speed, the vehicular information estimation apparatus generates the guide information 710 including information related to a decrease in speed and the target speed. If the predicted average speed is less than or equal to the target speed, the vehicular information estimation apparatus generates the guide information 710 related to maintenance of the current driving speed.

The vehicular information estimation apparatus identifies a speed section satisfying a threshold in the speed profile. The speed section satisfying the threshold includes, for example, a speed section that influences a battery life. A sudden acceleration and/or sudden deceleration of the vehicle deteriorates the battery life. Accordingly, a section in which sudden acceleration or sudden deceleration of the vehicle is expected influences the battery life is. However, the speed section that influences the battery life is not limited thereto. The vehicular information estimation apparatus generates the guide information 710 related to driving on a route corresponding to the identified speed section. For example, the vehicular information estimation apparatus displays the guide information 710 indicating that safe driving is needed on the route corresponding to the identified speed section through a display. Thus, the vehicular information estimation apparatus guides driving suitable for a battery life state. The description provided with reference to FIGS. 1 through 6 are applicable to FIG. 7, and thus repeated descriptions will be omitted herein for conciseness.

Figure 8:
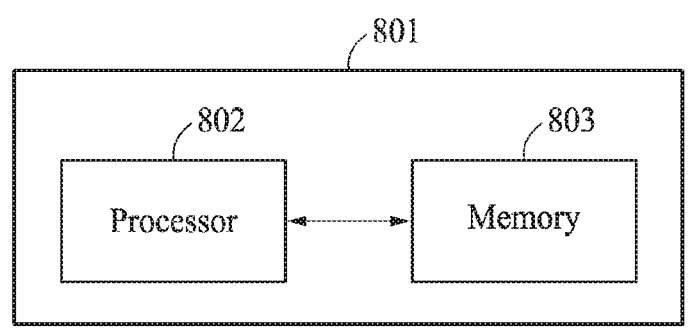
FIG. 8 illustrates an example of a vehicular information estimation apparatus.

FIG. 8 illustrates an example of a vehicular information estimation apparatus.

Referring to FIG. 8, a vehicular information estimation apparatus 801 includes a processor 802 and a memory 803. The processor 802 may include at least one device described with reference to FIGS. 1 through 7, or may perform one or more methods described with reference to FIGS. 1 through 7. The memory 803 may store membership functions of driving characteristics and information associated with a driver type. Also, the memory 803 may store a vehicular information estimation method and a program in which the vehicular information estimation method is implemented.

The processor 803 executes a program and controls the vehicular information estimation apparatus 801. In an example, a code of the program executed by the processor 802 is stored in the memory 803. In an example, the vehicular information estimation apparatus 801 is connected to an external device, for example, a personal computer or a network through an input and output device (not shown) to perform a data exchange.

The vehicular information estimation apparatus, and other apparatuses, units, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. For example, a processor may include multiple processors or a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating driving information, the method comprising:
   receiving a driving route of a vehicle;
   generating speed deviations corresponding to points on the driving route; and
   generating a speed profile comprising a sequence of predicted speeds corresponding to the points based on the speed deviations and average speeds corresponding to the points,
   wherein the average speeds corresponding to the points comprises any one or any combination of the a statistical average speed of vehicles travelling at each of the points and an average speed of vehicles based on a current traffic flow at the each of the points.

2. The method of claim 1, wherein the generating of the speed deviations comprises:
   acquiring a driving characteristic of the driving route; and
   generating the speed deviations based on the driving characteristic and relative locations of the points using an adaptive neuro-fuzzy inference system (ANFIS).

3. The method of claim 2, wherein the ANFIS comprises a membership function of the driving characteristic, and
   the driving characteristic comprises any one or any combination of a driver type, a traffic flow, a weather condition, a road type, and a road curvature.

4. The method of claim 3, wherein the ANFIS comprises ANFISs corresponding to membership functions of the driver type, and
   the generating of the speed deviations comprises:
   generating sub-road-types corresponding to the road type of the relative locations;
   selecting an ANFIS corresponding to a membership function among the membership functions of the driver type based on a sub-road-type corresponding to a relative location among the relative locations; and
   generating a speed deviation corresponding to the relative location based on the sub-road-type and the relative location using the selected ANFIS.

5. The method of claim 3, wherein the driver type is defined based on a speed deviation corresponding to the road type.

6. The method of claim 3, wherein a membership function of the driver type comprises at least one of a membership function corresponding to a conservative type, a membership function corresponding to a normal type, or a membership function corresponding to an aggressive type,
   a membership function of the traffic flow comprises at least one of a membership function corresponding to a light flow, a membership function corresponding to a medium flow, or a membership function corresponding to a heavy flow,
   a membership function of the weather condition comprises at least one of a membership function corresponding to a clear weather condition or a membership function corresponding to a wet weather condition,
   a membership function of the road type comprises at least one of a membership function corresponding to a local road, a membership function corresponding to a local highway, or a membership function corresponding to a highway, and
   a membership function of the road curvature comprises at least one of a membership function corresponding to a small curvature, a membership function corresponding to a medium curvature, or a membership function corresponding to a large curvature.

7. The method of claim 1, wherein the generating of the speed deviations comprises:
   acquiring a driving characteristic of the driving route;
   generating sub-driving-characteristics corresponding to each of the points based on the driving characteristic and a location of the each of the points; and
   generating a speed deviation corresponding to a relative location among the relative locations based on the relative location and a sub-driving-characteristic corresponding to the relative location.

8. The method of claim 1, wherein the generating of the speed deviations comprises:
   acquiring a driving characteristic of the driving route;
   generating sub-driving-characteristics corresponding to each of the points based on the driving characteristic and a location of the each of the points; and
   generating an output vector representing the speed deviations based on a first input vector representing the relative locations and a second input vector representing the sub-driving-characteristics.

9. The method of claim 1, wherein the generating of the speed deviations comprises:
   determining a number of the points by comparing a length of the driving route to a threshold length; and
   setting the points on the driving route based on the determined number of the points.

10. The method of claim 1, wherein the generating of the speed deviations comprises:
    dividing the driving routes into sub-driving-routes by comparing a length of the driving route to a threshold length; and
    generating speed deviations corresponding to points on a sub-driving-route among the sub-driving-routes.

11. The method of claim 1, further comprising:
    predicting an amount of power to be used by the vehicle based on the speed profile.

12. A method of estimating driving information, the method comprising:
    receiving a driving route of a vehicle;
    generating speed deviations corresponding to points on the driving route;
    generating a speed profile comprising a sequence of predicted speeds corresponding to the points based on the speed deviations and average speeds corresponding to the points;
    predicting an amount of power to be transferred to a powertrain of the vehicle based on the speed profile; and
    predicting an amount of power to be used by an air conditioning system of the vehicle based on any one or any combination of solar radiation information and ambient temperature information.

13. The method of claim 1, further comprising:
    determining a driving range of the vehicle based on a predicted value of an amount of power to be used by the vehicle and at least one of a current amount of fuel of the vehicle or current state information of a battery unit of the vehicle.

14. The method of claim 13, wherein the determining of the driving range of the vehicle comprises:
    predicting at least one of an amount of fuel or state information of the battery unit at a destination based on the predicted value; and
    determining whether the vehicle is able to reach the destination based on at least one of the predicted amount of fuel or the predicted state information.

15. The method of claim 1, further comprising:
generating guide information to drive the vehicle based on the speed profile; and
outputting the guide information visually.

16. The method of claim 15, wherein the generating of the guide information comprises:
comparing a predicted speed obtained based on the speed profile and a target speed obtained based on driving history information of the vehicle; and
generating the guide information based on the comparison.

17. The method of claim 15, wherein the generating of the guide information comprises:
identifying a speed interval satisfying a criterion from the speed profile; and
generating guide information used for driving on a route corresponding to the identified speed interval.

18. A non-transitory computer-readable medium storing instructions, that when executed by a processor, cause the processor to perform the method of claim 1.

19. An apparatus for estimating driving information, the apparatus comprising:
a processor configured to receive a driving route of a vehicle, to generate speed deviations corresponding to points on the driving route, and to generate a speed profile comprising a sequence of predicted speeds corresponding to the points based on the speed deviations and average speeds corresponding to the points,
wherein the average speeds corresponding to the points comprises any one or any combination of the a statistical average speed of vehicles travelling at each of the points and an average speed of vehicles based on a current traffic flow at the each of the points.

20. The apparatus of claim 19, wherein the processor is further configured to acquire a driving characteristic of the driving route and to generate the speed deviations based on the driving characteristic and relative locations of the points using an adaptive neuro-fuzzy inference system (ANFIS),
the ANFIS comprises a membership function of the driving characteristic, and
the driving characteristic comprises any one or any combination of a driver type, a traffic flow, a road type, and a road curvature.

* * * * *